United States Patent [19]

Hartmann

[11] 4,267,794
[45] May 19, 1981

[54] APPARATUS FOR COATING ARTICLES WITH ENAMEL SLIP

[75] Inventor: Ferdinand Hartmann, Vienna, Austria

[73] Assignee: Austria Email Aktiengesellschaft, Vienna, Austria

[21] Appl. No.: 161,785

[22] Filed: Jun. 23, 1980

[30] Foreign Application Priority Data

Jul. 2, 1979 [AT] Austria ................................. 4625/79

[51] Int. Cl.³ .......................... B05C 9/00; B05C 11/11; B05C 13/00
[52] U.S. Cl. ..................................... 118/50; 118/421; 134/76
[58] Field of Search .......................... 118/421, 429, 50; 134/76, 77; 427/294–298

[56] References Cited

U.S. PATENT DOCUMENTS

| 360,952 | 4/1887 | Crowell | 118/421 X |
| 1,974,918 | 9/1934 | Hanson | 118/421 X |
| 2,416,475 | 2/1947 | Friedman | 134/76 X |
| 3,017,828 | 1/1962 | Behringer | 118/203 X |
| 3,769,934 | 11/1973 | Dunn, Jr. | 118/421 X |

FOREIGN PATENT DOCUMENTS

| 265814 | 10/1968 | Austria | 118/50 |
| 1208790 | 9/1959 | France | 118/421 |

Primary Examiner—Morris Kaplan
Attorney, Agent, or Firm—Fleit & Jacobson

[57] ABSTRACT

Apparatus for coating articles with enamel slip comprises an evacuatable container 1, which is divided in a vertical plane into parts 2, 3, which are movable toward and away from each other. The articles 29 to be coated are suspended in a row from an endless conveyor track and are introduced into the container 1 when its parts 2, 3 have been moved apart to open the container 1. The container 1 is then closed. In the closed container, the suspension means are held between soft seals 12, 13 which cover the confronting edges of the container parts 2, 3. When the container 1 has been closed, the air contained therein is sucked off and slip is sucked into the container. As soon as the coating operation has been completed, the slip is drained from the container 1 and the latter is then opened and the coated article is removed.

6 Claims, 2 Drawing Figures

APPARATUS FOR COATING ARTICLES WITH ENAMEL SLIP

SUMMARY OF INVENTION

The apparatus serves to coat articles with enamel slip in an evacuatable container, which consists of two parts which at their confronting edges are provided with respective seals and which are movable toward and away from each other. The articles to be enameled are suspended from an endless conveyor track by means of wires and when the container has been opened are moved between its two parts. The container is then closed so that said wires are embedded between the seals.

This invention relates to apparatus for coating articles, such as exhaust mufflers for motor vehicles and similar hollow bodies, with enamel slip, comprising an evacuatable container for receiving the articles to be coated.

Apparatus of this kind known from Austrian Patent Specification No. 265,814 comprises an open-bottomed vessel (bell or caisson), which was selectively connected to a vacuum source. The articles to be coated were held in an enamel slip supply vessel over the surface of the slip therein, and the bell was lowered to surround the articles until the lower rim of the bell was immersed into the slip. The bell was then evacuated to remove air even from minute fissures, gaps, cracks, pores and the like in the articles and subsequently to suck the slip into the bell.

Whereas the use of that apparatus has resulted in a very thorough ingress of the enamel slip into pores, gaps, fissures, cracks, slits or the like in the articles, it had the disadvantage that the bell was disposed above the slip vessel, so that it was necessary to move the uncoated articles into the bell from the side thereof and to remove the coated articles from the bell to the side thereof and it was not possible to use hangers, endless conveyor tracks and the like handling means which would permit a rapid operation. Besides, the bell had to be raised to a very high elevation to permit of a mounting and removal of the articles, and had to be lowered to a low elevation so that a seal between the lower rim of the bell and the slip was ensured even when the slip had been sucked into the bell and the slip surfaces had been lowered correspondingly. All these requirements have rendered a rapid operation and a quick coating of numerous articles in short intervals of time impossible.

In an endeavour to eliminate these disadvantages it is proposed in apparatus of the kind described first hereinbefore to provide a container comprising two parts, which are preferably pivotally movable toward and away from each other.

Further features of the invention will now be explained with reference to the drawings, in which a non-limiting embodiment of the apparatus according to the invention is shown by way of example.

Figure 1:
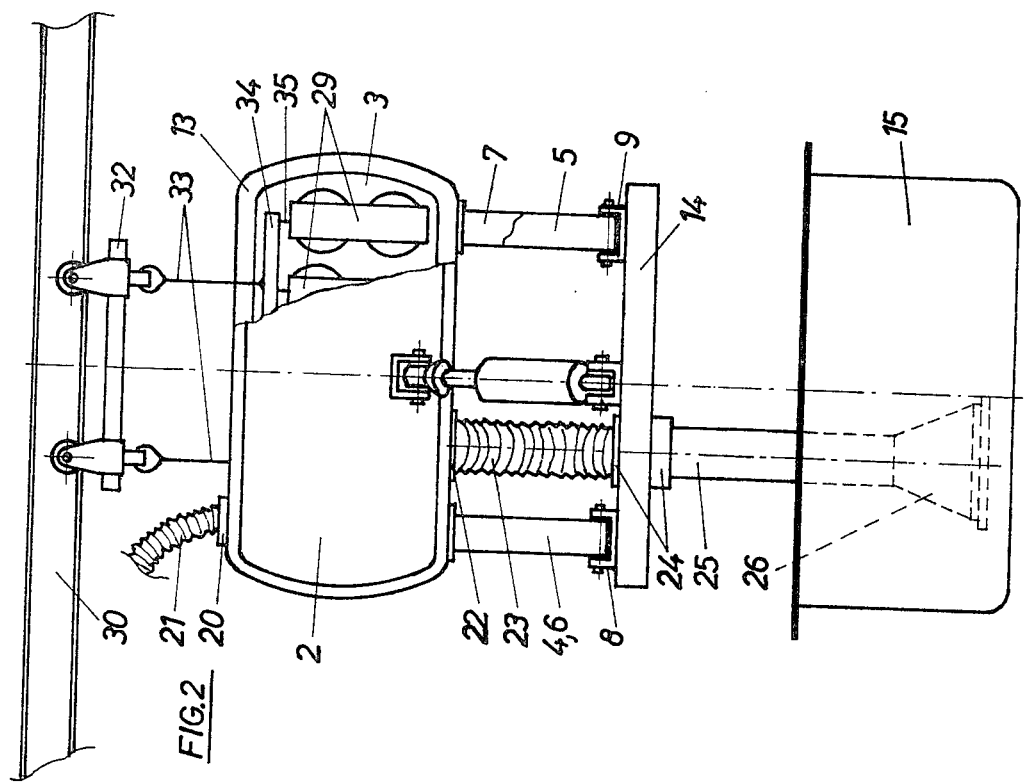
FIG. 1 is a side elevation showing the apparatus with the container closed, whereas the open state of the container is indicated by dotted lines.
Figure 2:
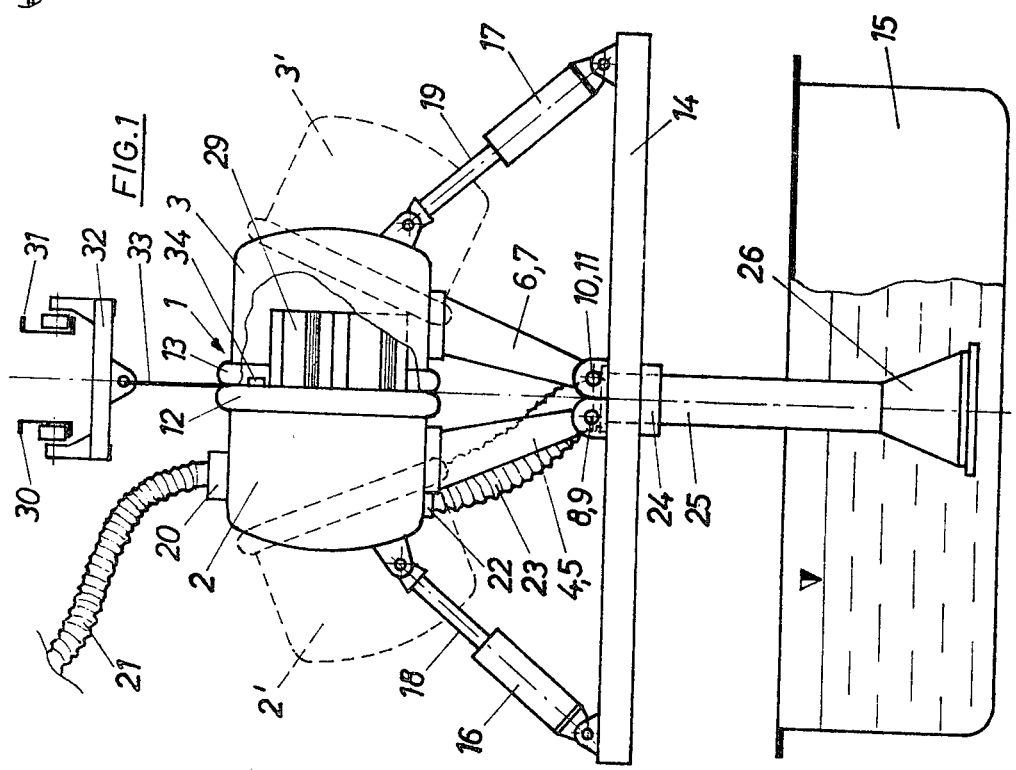
FIG. 2 is a front elevation showing the apparatus.

In both figures, parts of the container are shown broken away so that the articles to be coated can be seen.

A container generally designated 1 is divided in a vertical plane into two parts 2 and 3. Each of the parts 2 and 3 is rigidly secured to two legs 4, 5 or 6, 7. The two legs 4, 5 or 6, 7 associated with each of the parts 2 and 3 are mounted in hinges 8, 9 or 10, 11, respectively, which have horizontal axes. Each of parts 2 and 3 carries at its edge facing the other part of the container a seal 12 or 13, which is closed in itself and consists of very soft material such as foamed rubber having closed cells, or the like.

The hinges 8 to 11 are mounted on a frame, which is held in a fixed position above a slip supply vessel 15 by means not shown.

Pneumatic piston-cylinder devices 16, 17 are hinged to the frame 14 and have respective piston rods 18, 19, which are connected to the container parts 2, 3, respectively.

The container part 2 is provided at its top with a valve 20, which is connected by a hose 21 to a vacuum source, not shown. Another hose fitting 22 is provided in the bottom of container part 2 and is connected by a hose 23 to a connector 24, which is mounted on the frame 14 and carries a short pipe 25 provided with a valve 26.

Two rails 30, 31 constituting an endless conveyor track are provided above the container 1 and carry cars 32, which are movable to feed articles 29 to be coated into the container 1 and to remove coated articles from the container 1. The articles 29 may consist of exhaust mufflers for motor vehicles. A carrying rod 34 is suspended from each car 32 by means of wires, thin rods or metal ribbons 33. Articles 29 to be coated are suspended from the carrying rod 34 by means of wires 35.

The apparatus according to the invention operates as follows.

The piston-cylinder devices 16, 17 are operated at the same time in the retracting sense to open the container 1 in that its two parts 2 and 3 are moved to the positions designated 2' and 3' in FIG. 1. In these positions, the spacing of parts 2, 3 is so large that the articles 29 suspended from the car 32 can be moved in between the two parts 2 and 3. Thereafter the piston-cylinder devices 16 and 17 are operated to extend their pistons so that the two parts 2 and 3 are swung until they engage each other.

As a result, the bulgelike seals 12, 13 which are very soft, contact each other and also snugly and sealingly contact the wires 33 or the like so that the container 1 is now closed.

Then the valve 26 is closed and the valve 20 is opened so that most of the air in the container 1 is sucked off through hose 21. When a sufficiently high vacuum has been obtained in the container 1, the valve 26 is opened so that slip is sucked through the hose 23 into the container until the latter has been completely filled. The articles 29 are now entirely immersed in slip and, because the air has previously been sucked off, the slip can enter all gaps, pores, cracks, fissures and other free spaces in the articles 29.

After a residence time has expired, which has been ascertained by experience and during which the valve 26 may be closed, atmospheric pressure or a superatmospheric pressure is applied with the hose 21, and the valves 20 and 26 are opened. As a result, the slip contained in the container 1 is forced back into the supply vessel 15 very quickly.

The piston-cylinder devices 16 and 17 are now operated to retract their pistons so that the container parts 2 and 3 are swung once more to their positions 2' and 3' to open the container. The articles 29 which have now been uniformly coated with slip may then be moved by the car 32 to additional treating stations, in which the articles may be dried, cooled, stoved, assembled, etc., for instance.

The invention is not restricted to the embodiment shown by way of example. For instance, the pneumatic (or hydraulic) piston-cylinder devices 16 to 19 may be replaced by strictly mechanical drive means for moving the container parts 2 and 3. It may also be desirable to replace the legs 4 to 7 for supporting the container parts 2 and 3 by rails or the like means for guiding said parts and to arrange for parallel movements of said container parts toward and away from each other.

What is claimed is:

1. Apparatus for coating articles, comprising an evacuatable container consisting of two parts, which are movable toward and away from each other and have confronting edges which are covered with respective seals, and an endless conveyor track provided with hanger means for suspending said articles from said track, means for positioning said hanger means whereby to introduce said articles into the open container, means for moving said parts whereby the seals are operatively associated to tightly grip the hanger means therebetween and to close said container, and means for evacuating and for supplying the coating material to the closed container.

2. Apparatus according to claim 1, characterized in that said container parts are pivotally movable.

3. Apparatus according to claim 1, characterized in that each container part is rigidly secured to legs, which are pivoted on respective horizontal axes, and at least one actuator is pivoted to each container part to effect said movement.

4. Apparatus according to claim 3, characterized in that said horizontal axes extend below the container parts.

5. Apparatus according to claim 3, characterized in that the legs and the actuators are carried by a common frame.

6. Apparatus according to claim 1, characterized in that said means for evacuating and supplying comprise hoses connected to at least one of the container parts and respectively communicating with a vacuum source and a coating material source.

* * * * *